(12) United States Patent
Abdelsamie

(10) Patent No.: US 10,325,270 B2
(45) Date of Patent: Jun. 18, 2019

(54) METHODS AND SYSTEMS FOR ENVIRONMENTAL CREDIT SCORING

(71) Applicant: Maher A Abdelsamie, Matawan, NJ (US)

(72) Inventor: Maher A Abdelsamie, Matawan, NJ (US)

( * ) Notice: Subject to any disclaimer, the term of this patent is extended or adjusted under 35 U.S.C. 154(b) by 0 days.

(21) Appl. No.: 16/043,453

(22) Filed: Jul. 24, 2018

(65) Prior Publication Data

US 2019/0026750 A1    Jan. 24, 2019

Related U.S. Application Data

(60) Provisional application No. 62/536,314, filed on Jul. 24, 2017, provisional application No. 62/695,448, filed on Jul. 9, 2018, provisional application No. 62/700,240, filed on Jul. 18, 2018.

(51) Int. Cl.
*G06Q 30/00* (2012.01)

(52) U.S. Cl.
CPC .................................. *G06Q 30/018* (2013.01)

(58) Field of Classification Search
None
See application file for complete search history.

(56) References Cited

U.S. PATENT DOCUMENTS

| 9,916,621 | B1 * | 3/2018 | Wasser | G06Q 40/025 |
| 2011/0282728 | A1 * | 11/2011 | Bingham | G06Q 30/0201 |
| | | | | 705/14.36 |
| 2013/0311484 | A1 * | 11/2013 | Zhou | G06F 17/30864 |
| | | | | 707/748 |
| 2014/0108277 | A1 * | 4/2014 | Dresner | G06Q 30/018 |
| | | | | 705/317 |
| 2014/0143138 | A1 * | 5/2014 | Wiseman | G06Q 20/3674 |
| | | | | 705/39 |
| 2014/0214505 | A1 | 7/2014 | Shuster-Arechiga | |
| 2016/0140355 | A1 * | 5/2016 | Jagota | G06F 21/6218 |
| | | | | 707/785 |

FOREIGN PATENT DOCUMENTS

| EP | 2779042 A1 | 9/2014 |
| KR | 101684466 B1 | 12/2016 |

* cited by examiner

*Primary Examiner* — Kaveh Abrishamkar
(74) *Attorney, Agent, or Firm* — Georgiy L. Khayet

(57) ABSTRACT

A method and system are provided for environmental credit scoring of a plurality of users, partners, and distributors comprising: registering the plurality of users, partners, and distributors; receiving information from the registered users; receiving environmental activity records from partners, and distributors; assigning each activity an identification number; verifying the environmental activity records; calculating a score of each environmental activity; calculating an environmental credit score of the partners and distributors; receiving data from a point of service system; identifying the environmental activity records of users, partners and distributors, and crediting respective environmental activity records; calculating an environmental credit score for the users based on the environmental activities' data credited under the environmental activity record of the users; analyzing the environmental credit score of the users, partners, and distributors; and publishing the environmental credit scores.

20 Claims, 4 Drawing Sheets

METHODS AND SYSTEMS FOR ENVIRONMENTAL CREDIT SCORING

CROSS REFERENCE TO RELATED APPLICATION

This application claims priority from U.S. Provisional Patent Application Ser. No. 62/536,314, filed on Jul. 24, 2017, entitled "METHODS AND SYSTEM FOR ENVIRONMENTAL CREDIT SCORING", U.S. Provisional Patent Application Ser. No. 62/695,448, filed on Jul. 9, 2018, entitled "METHODS AND SYSTEM FOR ENVIRONMENTAL CREDIT SCORING", and U.S. Provisional Patent Application Ser. No. 62/700,240, filed on Jul. 18, 2018, entitled "METHODS AND SYSTEMS FOR ENVIRONMENTAL CREDIT SCORING". Each of the above stated applications is hereby incorporated herein by reference in its entirety.

TECHNICAL FIELD

The present invention relates generally to methods and system for environmental credit scoring based on environmental activities of users, partners, and distributors.

BACKGROUND

With the widespread use of the internet and growth of computing systems, one area that has not achieved significant development is environmental rating techniques and systems. These techniques and systems have failed to get individuals, businesses, nonprofit organizations, and governmental entities to work together to effectively combat current environmental issues.

Currently, the earth is facing many environmental issues such as climate change, air pollution, ozone depletion, water pollution, deforestation, desertification, habitat destruction, toxic chemicals, natural resource extraction, light and noise pollution, acid rain, medical waste, and littering and landfills. Climate change and global warming are among the top serious environmental issues. Global warming is caused by an increase in the concentrations of greenhouse gases in the atmosphere and refers to the ongoing and recent rise in average global temperature near the Earth's surface, which in turn is causing a change in climate patterns. Significant changes in climate measurements, including temperature, wind patterns, and precipitation, over several decades or longer is called climate change. The scientific literature has noted that there are substantial and far-reaching risks and implications of climate change on environment and public health.

With the growing concerns over environmental issues, such as global warming and resource depletion, the type and number of certifications and green product standards have grown, and many green certifications developed for homes, schools, manufacturers, restaurants, hotels, cleaning companies, and so on have been expanded to include a wider range of environmental issues to determine the impact of their products in terms of manufacture, use, and reuse. A green certification provides confirmation that the goods or services meet mandatory or voluntary standards and offer an environmental benefit. The International Organization for Standardization (ISO) has developed three types of environmental product claims: type I environmental labels based on ISO 14024, type II self-declared environmental claims based on ISO 14021, and type III environmental product declarations based on ISO 14025. The type III environmental product declaration is a standardized (ISO 14025) and life cycle assessment-based tool. To be published, type III environmental declarations require an independent agency, called a program operator, to supervise the full development process of the environmental product declaration. Environmental product declaration is a report that focuses on the ways in which a product or service affects the environment throughout its life cycle. This declaration is an internationally accepted, independently verified, registered, and published document.

Harmful atmospheric emissions; the use of raw materials, water, and energy; and waste generation during building demolition, construction, repurposing, occupancy, and renovation have caused extensive impacts on the environment. To mitigate the impact of building on the natural environment, sustainability rating systems, green building standards, and certifications have been developed internationally, including LEED and Energy Star in the United States; BREEAM in the United Kingdom; Green Mark in Singapore; BEAM Plus in Hong Kong; and Green Star, NABERS Energy, and NABERS Water in Australia.

Within the banking community there is also an increase in the incorporation of environmental and social factors into credit scoring systems beyond normal financial viability. Financial institutions have created many green financial products such as green insurance, green securities, and green loans to satisfy market demand for financial products that support sustainable economic development. Although environmental criteria are incorporated into credit risk assessment methods, these environmental factors are limited, and the lending is dependent on environmental criteria for the planned use of funds.

Although there are currently hundreds of international green product certifications, including about 100 certifications in the United States, they have failed to get individuals, businesses, nonprofit organizations and governmental entities to work together to effectively combat current environmental issues. In addition, their effectiveness in generating a significant increase in individual participation in environmental activities is limited.

The efforts of individuals, businesses, nonprofit organizations, and governmental entities to solve current environmental issues, such as climate change, must be increased. For example, to quickly and effectively address current climate change and global warming issues, all entities must significantly reduce the amount of greenhouse gas emissions (heat-trapping emissions) they are putting into the atmosphere. The total amount of greenhouse gases expressed in equivalent tons of carbon dioxide ($CO_2$) that is produced to directly and indirectly support human activities is commonly known as "carbon footprint."

Implementing most solutions requires commitment and responsibility from individuals, businesses, nonprofits, and governmental entities to work together to combat the current environmental issues. Therefore, there is a substantial need for a dedicated comprehensive environmental credit score to encourage individuals, businesses, nonprofits, and governmental entities to cooperate and actively engage in the environmental activities such as recycling; purchasing environmentally friendly products and services; and using renewable electricity, electric vehicles, and other environmentally friendly products and services.

SUMMARY

In accordance with one or more embodiments, a method for environmental credit scoring based on environmental activities of a plurality of users, partners, and distributors is provided. The method includes registering a plurality of users, partners, and distributors with a server computer system by creating a distributor environmental activity record, a partner environmental activity record, and a user environmental activity record accessible by the server computer system for each of the plurality of distributors, partners, and users and associating each distributor's, partner's, and user's record with a unique user identifier. The method also includes receiving information from the registered users comprising personal information and information about one or more environmental activities completed by the registered users before becoming registered users. The environmental activities information includes but not limited to information on home energy, transportation, waste, food, and shopping. The method also includes verifying the information provided by the registered users with at least one of the registered partners and/or an unregistered entity. The method also includes calculating, using one or more algorithms, an estimated environmental impact of each of the user's environmental activities based on the information received from each of the registered users. The method also includes suggesting at least one environmental activity to each of the registered users for reducing the environmental impact of the registered user's environmental activities based on the calculated environmental impact of the environmental activities completed before becoming a registered user.

The method further includes receiving at least one environmental activity record from at least one of a plurality of partners and a plurality of distributors in real time. The environmental activity record comprises data relating to a plurality of environmental activities and environmental law violations offered or reported by the plurality of partners, environmental activities distributed to the plurality of partners by the plurality of distributors, and environmental activities used by the plurality of distributors to distribute environmental activities to the plurality of partners. Each environmental activity offered by a partner and/or used by a distributor includes but not limited to an environmental product declaration. The method further includes assigning each of the environmental activities and environmental law violations an identification number. The method al so includes verifying at least one environmental activity record with at least one environmental product declaration program operator, a registered partner, or an unregistered entity.

The method also includes calculating, using one or more algorithms, a score of each verified environmental activity, such as a product and/or service, based on the environmental impact information included in the verified environmental product declaration of a product and/or service offered by the partner and the information included in the verified environmental product declarations of similar products and services offered by other partners. The method also includes calculating, using one or more algorithms, a score of each environmental law violation reported by the partners based on the environmental impact of each environmental law violation. The method also includes calculating, using one or more algorithms, an environmental credit score of the partners based on the calculated scores of the verified environmental activities offered by the partners and environmental law violations of the partners.

The method also includes calculating, using one or more algorithms, a score of each verified environmental activity, such as a product and/or service, based on the environmental impact information included in the verified environmental product declaration of a product and/or service used by the distributor to distribute environmental activity such as a product and/or service to the registered partner and/or an unregistered entity, and the information included in the verified environmental product declarations of similar products and/or services used by other distributors to distribute environmental activities. The method also includes calculating, using one or more algorithms, an environmental credit score of the distributors based on the calculated scores of the verified environmental activities used by the distributors to distribute the environmental activities and environmental law violations of the distributors.

The method also includes receiving data relating to environmental activities completed by a registered user from a point of service system of a registered partner, wherein the registered user enters a unique user identifier at the point of service system to access the registered user's environmental activity record and the registered partner identifies and verifies the registered user to confirm the completion of one or more environmental activities by the registered user. The method further includes identifying the environmental activity records of at least one of the plurality of users, partners, and distributors associated with the unique user identifier for each of the environmental activities completed by the user and crediting the respective environmental activity records based on the environmental activities completed by the user. The method further includes calculating, using one or more algorithms, an environmental credit score of the registered user based on factors including but not limited to (a) the number, category, and environmental impact of the environmental activities of the registered user aimed at protecting the environment; (b) the length of the history of the environmental activities of the registered user; (c) the score of the environmental product declaration of each environmental activity completed by the registered user; (d) the responses of the registered user to the activities suggested by the server computer system based on the environmental activities of the registered user before being a registered user; and (e) the type and number of environmental law violations of the registered user. The method also includes analyzing the environmental credit score of users to determine the one or more users with a high environmental credit score. The method further includes publishing the environmental credit scores of the users, partners, and distributors under respective environmental activity records of the registered users, registered partners, and registered distributors, and notifying users, partners, and distributors.

The method also includes analyzing the environmental credit scores of users in various areas including but not limited to the type of environmental activities, geographical areas, and any other areas. The method also includes publishing the environmental credit score data of users, partners, and distributors under the environmental activity records of users, partners, and distributors; granting a user benefits such as points when the user refers another user to register with the server computer system; and marking users, partners, and distributors with high environmental credit scores with marks, signs, or symbols.

According to an aspect of the present disclosure, the environmental credit score of the registered users is used by private and/or public and/or voluntary sectors and/or other entities in areas including but not limited to employment decisions, university admission decisions, landlord-tenant decisions, and decisions of the government toward individuals, companies, and any other entities as well as using the environmental credit score in other areas that may affect consumer's lives including but not limited to determining whether a service, an award, a credit, or a scholarship should be offered or granted to the user. The method also includes providing distributors with information on the environmental activities that have been distributed to partners and completed by users.

According to an aspect of the present disclosure, the personal information and environmental activities information of the registered users, registered partners, and registered distributors is stored in a database.

According to an aspect of the present disclosure, the environmental credit score of the registered partners and distributors is calculated for at least one of a specific geographical area, a specific type of environmental activities, a specific category or classification of a product or service.

According to an aspect of the present disclosure, the environmental credit scores of the partners and distributors may be used in areas including but not limited to decisions by the government towards companies and towards any other entities.

According to an aspect of the present disclosure, the environmental activities comprising all activities classified under the environmental activities mentioned in the United Nations expert group meeting on classifications (New York, 20 May 2011) and consists of three parts: (a) Environmental protection activities and expenditures, (b) Resource management activities and expenditures, and (c) Resource use activities and expenditures. The term "environmental activities" also refers to all activities aimed at protecting the environment including but not limited to recycling; purchasing environmentally friendly products and services; and using renewable electricity, electric vehicles, and other environmentally friendly products and services.

According to another aspect of the present disclosure, an option is presented to the users to search for an environmental activity comprising product and/or service offered by a partner in at least one geographical location through at least one of a website hosted by the server computer system and a mobile application.

According to an aspect of the present disclosure, environmental activities offered by a partner are suggested, promoted and accessible to the registered users, and the environmental activities with high scores are given priority to be suggested and promoted to the registered user.

According to an aspect of the present disclosure, a geographical location of the users is determined and environmental activities are suggested to the user based on factors including but not limited to the location of the environmental activities from the user and the environmental product declaration score of the environmental activities.

According to an aspect of the present disclosure, an environmental credit score for each of the registered users may be calculated based on the environmental impact of the environmental activities of the registered user before being the registered user and the participation of the registered user in the suggested at least one environmental activity after being the registered user.

According to an aspect of the present disclosure, each of the environmental activities has an associated environmental product declaration, the environmental product declaration may be in a machine-readable format and is a type III environmental product declaration based on ISO 14025 and (a) issued by a specific program operator, or (b) issued by a specific program operator in a specific geographical area where the server computer system operates such as a specific state, country, continent, or region, or (c) based on a harmonized product category rules including but not limited to the European pilot for Product and Organization Environmental Footprint Category Rules (PEFCR, OEFCR).

According to an aspect of the present disclosure, more points may be added to the environmental credit score of one or more users participating in environmental activities with a high score environmental product declaration.

According to an aspect of the present disclosure, a distributor of the registered distributors monitors and tracks the environmental activities comprising products and/or services distributed to the partners and stored in the distributors' environmental activity record.

According to an aspect of the present disclosure, an environmental credit score for each of the registered distributors may be calculated based on factors including but not limited to the score and number of verified environmental activities used by the registered distributors to distribute environmental activities and the score, number of verified environmental law violations of the registered distributor, and distributor's responses to the suggestions of the server computer system.

According to an aspect of the present disclosure, the partners and distributors with high environmental credits cores may be marked with marks, signs, symbols and/or any other benefits, and the distributors with high environmental credit scores may be given the priority to be suggested to the partners.

In accordance with one or more embodiments, a system for environmental credit scoring based on environmental activities of a plurality of users, partners, and distributors is provided. The system includes a server computer system comprising a registration module configured to register a plurality of users, partners, and distributors by creating distributor, partner, and user environmental activity records that are accessible to each of the plurality of distributors, partners, and users. Each distributor's, partner's, and user's record is associated with a unique user identifier. The server computer system also includes a transceiving module configured to receive information from the registered users comprising personal information and information about one or more environmental activities completed by the registered users before becoming registered users, and assigns each of the environmental activities an identification number. The environmental activities include but are not limited to information on home energy, transportation, waste, food, and shopping; receive information comprising at least one environmental activity record from at least one of a plurality of partners and a plurality of distributors in real time, the environmental activity record comprising data relating to a plurality of environmental activities and environmental law violations offered or reported by the plurality of partners, environmental activities distributed to the plurality of partners by the plurality of distributors, and environmental activities used by the plurality of distributors to distribute environmental activities to the plurality of partners; assign each of the environmental activities an identification number; and receive data relating to environmental activities completed by a registered user from a point of service system of a registered partner. The plurality of point of service systems is configured to enable a registered user to enter a unique user identifier at one of a plurality of partners' point of service systems so as to access the registered user's environmental activity record; enable a registered partner to identify and verify the registered user to confirm the completion of one or more environmental activities by the registered user; and transmit data including but not limited to the unique user identifier of the registered user from at least one of the plurality of partners.

The server computer system also includes a verification module configured to verify at least one environmental activity record with at least one environmental product declaration program operator, a registered partner, or an unregistered entity. The server computer system also includes a processing module configured to calculate, using one or more algorithms, a score of each verified environmental activity, such as a product and/or service based on the environmental impact information included in the verified environmental product declaration of a product and/or service offered by the partner and the information included in the verified environmental product declarations of similar products and services offered by other partners; calculate, using one or more algorithms, a score of each environmental law violation reported by the partners based on the environmental impact of each environmental law violation; calculate, using one or more algorithms, an environmental credit score of the partners based on the calculated scores of the verified environmental activities offered by the partners and environmental law violations of the partners; calculate, using one or more algorithms, a score of each verified environmental activity, such as a product and/or service, based on the environmental impact information included in the verified environmental product declaration of a product and/or service used by the distributor to distribute environmental activities such as a product and/or service to a registered partner and/or an unregistered entity, and the information included in the verified environmental product declarations of similar products and/or services used by other distributors to distribute environmental activities; calculate, using one or more algorithms, an environmental credit score of the distributors based on the calculated scores of the verified environmental activities used by the distributors and environmental law violations of the distributors; identify the environmental activity records of at least one of the plurality of users, partners, and distributors associated with the unique user identifier for each of the environmental activities completed by the user, and credit the respective environmental activity records based on the environmental activities completed by the user; calculate, using one or more algorithms, an environmental credit score for the registered user based on factors including but not limited to (a) the number, category, and environmental impact of the environmental activities of the registered user aimed at protecting the environment; (b) the length of the history of the environmental activities of the registered user; (c) the score of the environmental product declaration of each environmental activity completed by the registered user; (d) the responses of the registered user to the activities suggested by the server computer system based on the environmental activities of the registered user before being a registered user; and (e) the type and number of environmental law violations of the registered user; and analyze the environmental credit scores of users, partners, and distributors to determine one or more users, partners, and distributors with a high environmental credit score. The processing module is also configured to analyze the environmental credit scores of users, partners and distributors in various areas including but not limited to the type of environmental activities, geographical areas, and any other areas; grant users with benefits such as points when the user refers another user to register with the server computer system; mark users, partners, and distributors with high environmental credit scores with marks, signs, or symbols; and add more points to the environmental credit score of one or more users participating in environmental activities with a high score environmental product declaration. The server computer system also includes a publication module configured to publish the environmental credit scores of users, partners, and distributors and notify users, partners, and distributors.

According to an aspect of the present disclosure, the server computer system further comprising a database configured to store personal information and environmental activities information of the registered users, registered partners, and registered distributors. The server computer system further includes a plurality of point of service systems in communication with the server computer system.

According to an aspect of the present disclosure, the processing module is further configured to allow users to search for an environmental activity such as a product and/or a service offered by a partner in a specific geographical location through at least one of a website hosted by the server computer system and a mobile application. The environmental activities are displayed to the users based on the score of the environmental product declaration of each of the environmental activities, wherein the environmental activities with a high score environmental product declaration are displayed first.

According to an aspect of the present disclosure, the processing module is further configured to determine the geographical location of the users and suggest environmental activities to the users based on a location of the environmental activities from the users and environmental product declaration score of the environmental activities.

According to an aspect of the present disclosure, the processing module is configured to calculate the environmental credit score for one of the partners after every verified environmental activity is credited in the registered partner's environmental activity record and/or at a regular interval and/or based on a request from the registered partner.

According to an aspect of the present disclosure, the processing module is further configured to: suggest at least one environmental activity to the registered user for reducing the environmental impact of environmental activities of the registered user based on the calculated environmental impact of the environmental activities before being the registered user; calculate an environmental credit score for each of the registered users based on the environmental impact of the environmental activities of the registered user before being the registered user and the participation of the registered user in the suggested at least one environmental activity after being the registered user; and analyze the environmental credit score of the plurality of users to determine one or more users with a high environmental credit score.

According to an aspect of the present disclosure, the processing module calculates the environmental credit score of the registered partner based on factors including but not limited to the score and number of verified environmental activities offered by the registered partner, the score and number of verified environmental law violations of the registered partner, and the responses of the registered partner to the suggestions of the server computer system.

According to an aspect of the present disclosure, the processing module calculates the environmental credit score of the registered distributor based on factors including but not limited to the score and number of verified environmental activities used by the registered distributors to distribute environmental activities and the score, number of verified environmental law violations of the registered distributor, and the responses of the registered distributor to the suggestions of the server computer system.

According to an aspect of the present disclosure, the processing module calculates the environmental credit score of the registered partner and distributor for at least one of a specific geographical area, a specific type of environmental activities, a specific category or classification of a product or service.

According to an aspect of the present disclosure, the calculation of an environmental credit score for one of the partners and distributors is done after every verified environmental activity credited in the registered partner's or distributor's environmental activity records and/or at a regular interval and/or based on a request from the registered partner or the registered distributor.

Various embodiments of the present invention are provided in the following detailed description and appended drawings. Without departing from the present invention, several details of the present invention may be capable of modifications in various respects, and the present invention is capable of various embodiments. Accordingly, the description and appended drawings of the present invention are provided as illustrations only, and they do not limit or define the scope of the invention being defined by the appended claims.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein.

The headings used herein are not meant to be used to limit the scope of the claims or description. The headings used herein are for organizational purposes only. To facilitate understanding, like reference numerals have been used, where possible, to designate like elements common to the figures.

DETAILED DESCRIPTION

The presently disclosed subject matter is described with specificity to meet statutory requirements. However, the description itself is not intended to limit the scope of this patent. Moreover, although the term "step" may be used herein to connote different aspects of methods employed, the term should not be interpreted as implying any particular order among or between various steps herein disclosed unless and except when the order of individual steps is explicitly described.

Reference throughout this specification to "one embodiment" or "an embodiment" means that a particular feature, structure, or characteristic described in connection with the embodiment is included in at least one embodiment of the disclosed subject matter. Thus, appearances of the phrases "in one embodiment" or "in an embodiment" in various places throughout this specification are not necessarily referring to the same embodiment.

As used in this specification and the appended claims, the singular forms "a," "an," and "the" include or otherwise refer to singular as well as plural referents, unless the content clearly dictates otherwise. As used in this specification and the appended claims, the term "or" is generally employed to include "and/or," unless the content clearly dictates otherwise.

The present invention relates generally to methods and system for environmental credit scoring based on environmental activities of users, partners, and distributors.

As used herein, the term "environmental activities" refers to all activities classified under the classification of environmental activities as mentioned in the United Nations expert group meeting on classifications (New York, 20 May 2011) and consists of three parts: (a) environmental protection activities and expenditures, (b) resource management activities and expenditures, and (c) resource use activities and expenditures. The term "environmental activities" also refers to all activities aimed at protecting the environment including but not limited to recycling; purchasing environmentally friendly products and services; and using renewable electricity, electric vehicles, and other environmentally friendly products and services.

Figure 1:
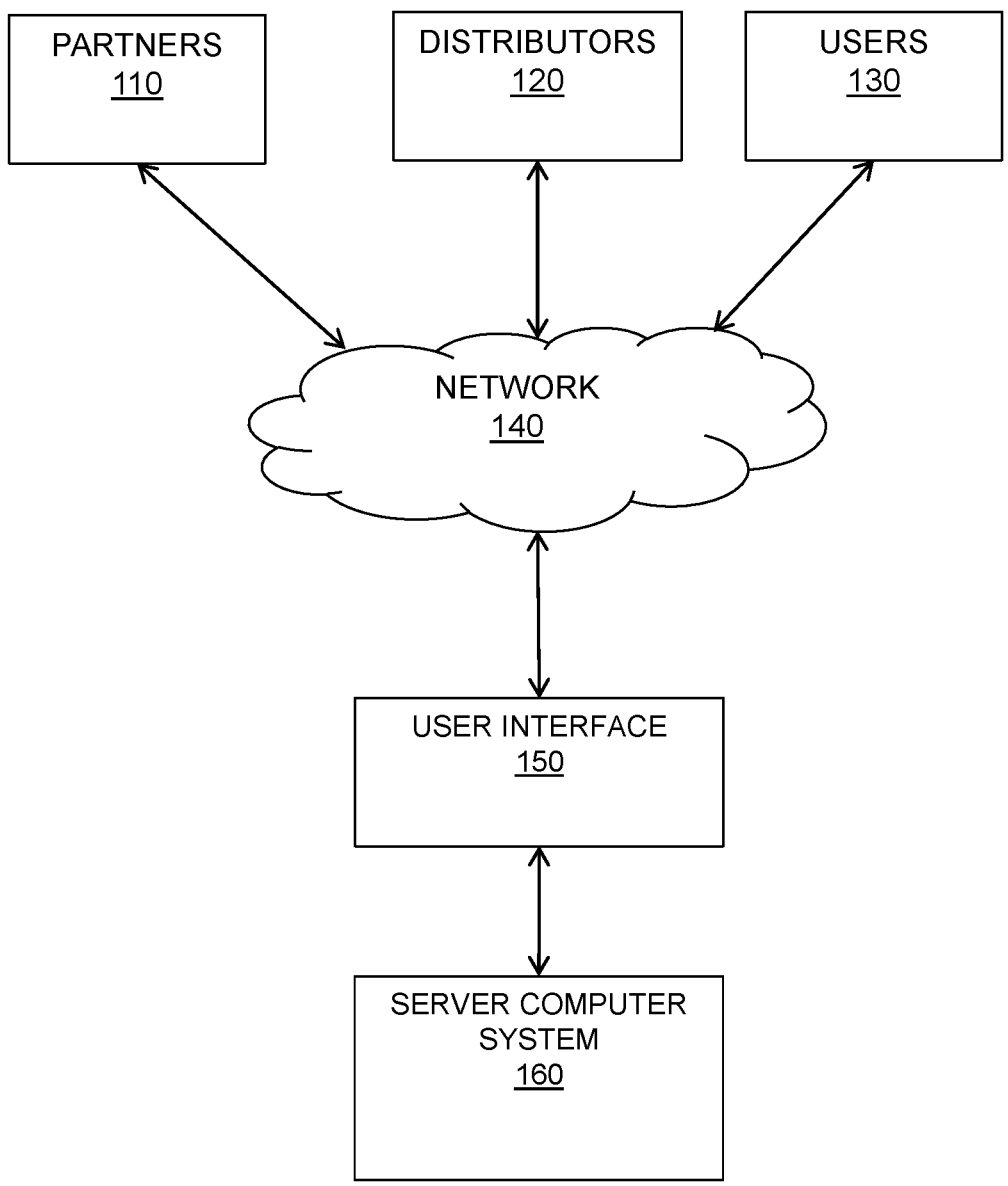
FIG. 1 is a block diagram illustrating an example of the overall system for environmental credit scoring based on environmental activities of users, partners and distributors in accordance with one or more embodiments.

FIG. 1 is a schematic block diagram illustrating the overall system for environmental credit scoring based on environmental activities of a plurality of users 130, a plurality of partners 110, and a plurality of distributors 120, in accordance with one or more embodiments. FIG. 1 schematically illustrates a system 100 for environmental credit scoring. The system 100 includes a server computer system 160 that communicates with the plurality of partners 110, distributors 120, and users 130, through a user interface 150 over a network 140. The user 130 may be an entity registered with the server computer system 160 for environmental credit scoring to complete an environmental activity offered by the partner 110. The users 130 can be an individual, and/or a business, and/or any other entities. The partner 110 can be any entity registered with the server computer system 160 for environmental credit scoring to offer environmental activities to the users 130 of the server computer system 160 or report users', partners', and distributors' environmental law violations and other information to the server computer system 160, and to transmit data relating to the environmental activities of users 130 to the server computer system 160. The partner 110 can be a business and/or a non-profit organization, and/or a governmental agency, and/or any other entities. The distributor 120 may be an entity registered with the server computer system 160 for environmental credit scoring to distribute environmental activities to the partners 110 of the server computer system 160 and may not transmit any environmental activity data of the users 130 to the server computer system 160. The distributors 120 can be a business, and/or a non-profit organization, and/or a governmental agency, and/or any other entities including but not limited to a product maker, middle agency or any entities distribute services and/or products.

The network 140 may include the Internet or a combination of networks or any other network capable of communicating data between devices including but not limited to a local intranet, a Local Area Network (LAN), and a Wide Area Network (WAN). Partners 110 of the server computer system 160 can communicate with the server computer system 160 using a point of service system.

A point of service system (not shown) may be a combination of point of service software and point of service hardware that may allow the partners 110 of the server computer system 160 to process and confirm environmental activities of the users 130 at locations of the partners 110 where a plurality of environmental activities is completed. According to various embodiments, the point of service systems may be configured to (a) collect and transmit a variety of data to the server computer system 160; (b) read the information off a user's identifying card or device such as barcode scanners, RFID and electronic tag readers and/or any other device that can be read by the point of service system; (c) identify or verify an individual using various devices including but not limited to cameras, touch screens devices and bio-metrics such as fingerprint readers, vein reader, facial recognition and hand geometry; (d) check the environmental credit data of the users 130 by communicating with the server computer system 160; (e) record the environmental activities of the users 130 and print a report; and/or (f) perform the functions of the point of service system described herein.

The point of service systems can be in various forms based on the type of environmental activities collected from the users 130 at the locations of the partners 110. The point of service systems can be in the form of a reverse vending machine, a website, a mobile application, and other forms. By way of non-limiting example, a point of service system of a partner of the partners 110 can be in the form of a reverse vending machine having a processor configured by a software and/or hardware to perform the functions described herein. By way of non-limiting example, the point of service systems of a partners 110 can be in the form of a website or a mobile application hosted by the server computer system 160 having a processor configured by software to perform the functions described herein, to confirm environmental activities completed by a user of the users 130 at partners' website and/or mobile application. By way of non-limiting example, the point of service systems of the partners 110 can be in the form of a device that can be installed virtually anywhere including public areas and having a processor configured by software to perform the functions described herein. By way of non-limiting example, the point of service systems of the partners 110 can be in the form of a portable device having a processor configured by software to perform the functions described herein. By way of non-limiting example, the point of service systems of the partners 110 can be in the form of a point of sale (POS) that can be used by a partner to confirm purchasing activities of users including but not limited to purchasing environmentally friendly products and services offered by a partner. The point of service hardware may comprise any point of sale (POS) hardware having a processor configured by software to perform the functions described herein. By way of non-limiting example, the point of service hardware may comprise a point of sale (POS) hardware manufactured and/or sold by companies including, but not limited to, Fujitsu, Ingenico, Datalogic, Honeywell Scanning and Mobility, Bitel, Keycorp, Vantiv, First Data, Wirecard, ATOS Worldline, Equinox, NCR, Castles Technology Spire Payments, Toast POS, and Square having a processor configured by software to perform the functions described herein.

The distributors 120, partners 110 and users 130 of the system 100 can communicate with the server computer system 160 using a computing device including, but not limited to, a mobile device, a workstation, a cell phone, a personal computer, a smartphone, a tablet computer, a laptop computer, a smart watch, or any other type of computing apparatus capable of communicating with the server computer system 160. The partners 110 and/or the distributors 120 and the users 130 can communicate with the server computer system 160 through the user interface 150. In some embodiments, the server computer system 160 includes a web server hosting one or more websites that are accessible by the distributors 120, the partners 110, and the users 130 over the network 140 such as the Internet.

The server computer system 160 may comprise a computer or multiple computers having a processor or multiple processors and a computer readable storage medium including but not limited to, a memory, or a removable drive, or a computer hard-drive, or multiple memories, computer hard drives, and removable drives, where a computer program or multiple computer programs may be stored on the computer readable storage medium and having executable instructions for performing the functions described herein.

Figure 2A:
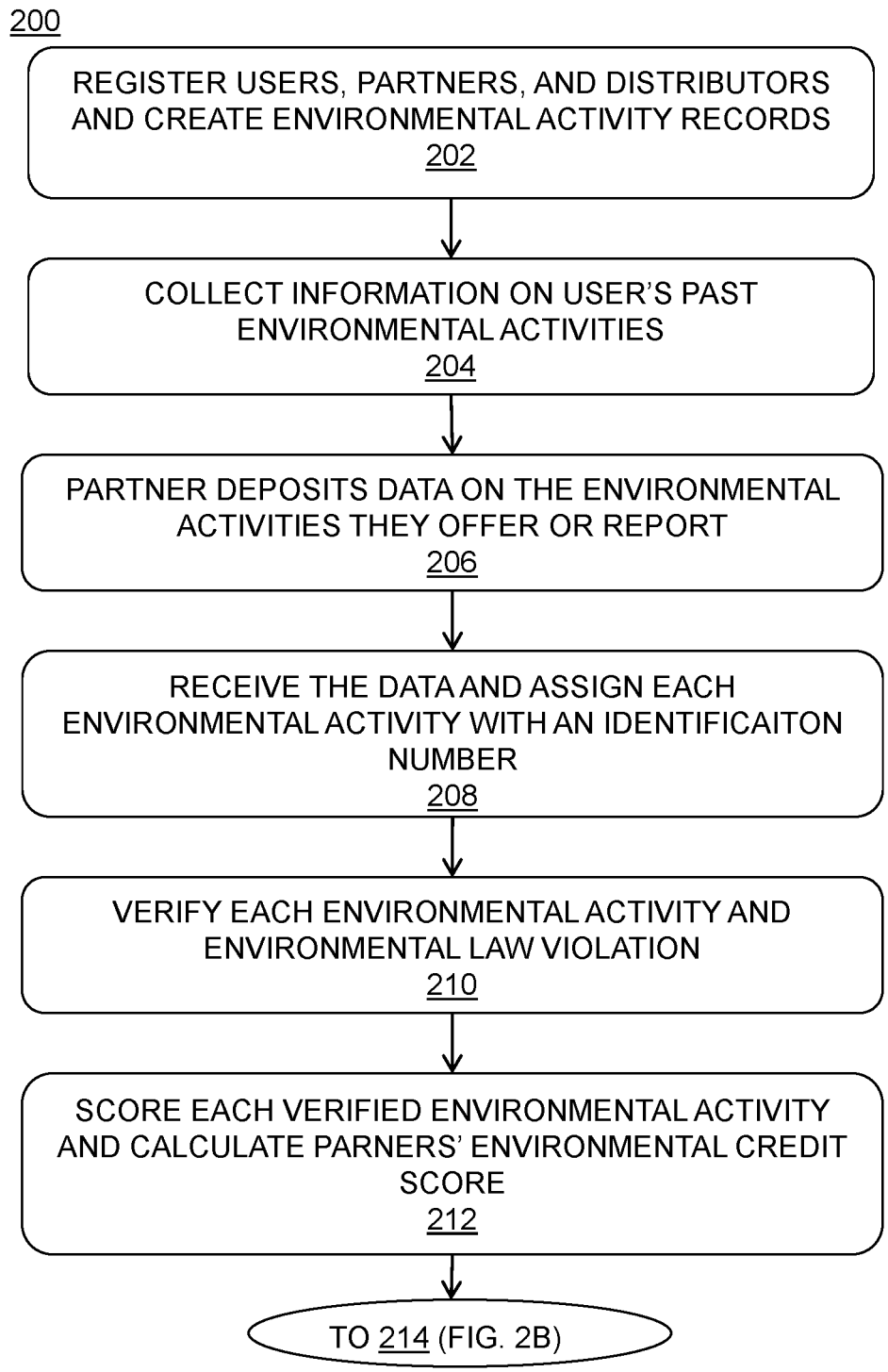
FIG. 2A and FIG. 2B show a simplified flowchart illustrating a method for environmental credit scoring based on environmental activities of users, partners and distributors, in accordance with one or more embodiments.
Figure 2B:
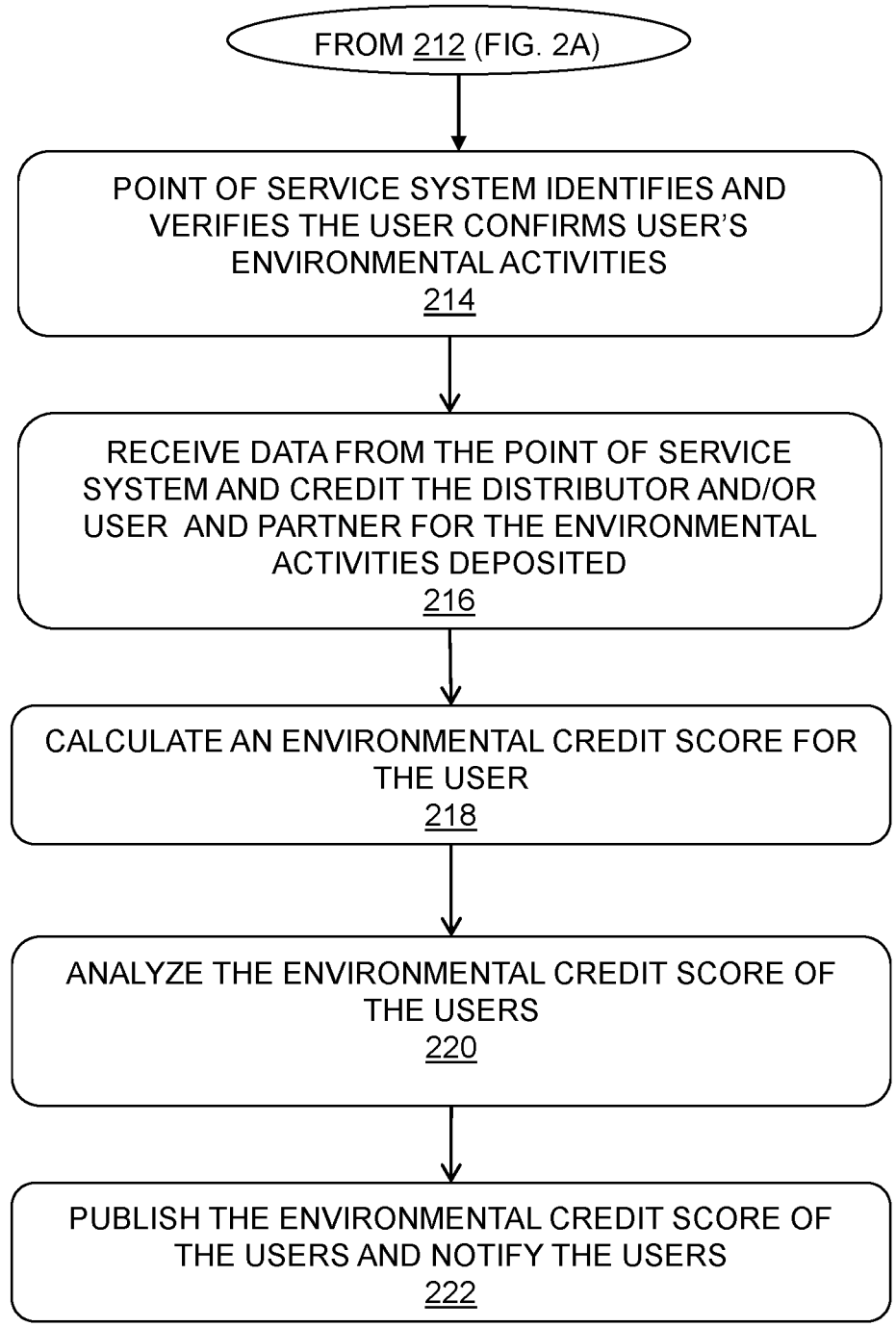

FIG. 2A and FIG. 2B show a flowchart 200 illustrating a method for environmental credit scoring based on environmental activities of users, partners and distributors, in accordance with one or more embodiments. As discussed with reference to FIG. 1, the users 130, the distributors 120, and the partners 110 can interact with the server computer system 160 via the network 140.

At step 202, a new partner of the partners 110, a distributor of the distributors 120, and a user of the users 130 register with the server computer system 160, preferably through a website hosted by the server computer system 160. Each of the distributors 120, partners 110, and users 130 are then assigned a unique user identifier. The unique user identifier may be, e.g., a number, symbols, alphabets, or any combination of letters and numbers assigned by the server computer system 160, other number selected by the user 130, or the user's telephone number. The server computer system 160 may create a record (or an environmental record) for each of the distributors 120, partners 110, and users 130 including the respective unique user identifiers of the distributors 120, partner 110, and users 130. The records of the distributors 120, partner 110, and users 130 may be stored in a database of the server computer system 160. In some embodiments, the records may be stored in a remote database.

At step 204, the server computer system 160 collects information on environmental activities completed by the user before becoming a registered user. The data may be collected from the user by the server computer system 160 during or after registering the user with the server computer system 160. The data/information collected from the user may include, but not limited to, personal information, information on the environmental activities of the user including but not limited to information on home energy, transportation, waste, food, and shopping. The server computer system 160 may verify the data provided by the user with a registered partner and/or an unregistered entity. The server computer system 160 may further calculate, using one or more algorithms an estimated environmental impact for user's environmental activities based on the data collected from the user. The server computer system 160 uses the environmental impact of user's environmental activities completed before being the registered user to suggest one or more environmental activities to the user. The suggested environmental activities may be aimed to reduce the environmental impact of user's environmental activities on the environment.

By way of non-limiting example, the server computer system 160 may suggest to the user the use of renewable electricity, the use of specific electric vehicles, the use of any other environmentally friendly products and/or services offered by a registered partner or an unregistered entity. The server computer system 160 may use the environmental impact of user's environmental activities before being a registered user and the participation of the user in the environmental activities suggested by the server computer system 160 after being a registered user in the calculation of an environmental credit score for the user. Information on environmental activities completed by the user before being the registered user and collected from the user during or after the registration process will be stored in the users' records in the database of the server computer system 160.

At step 206, the registered partner and the registered distributor transmit data to the server computer system 160. In some embodiments, the data is related to a plurality of environmental activities offered or reported by the partners 110 such as, environmental law violations of the users 130, partners 110 and distributors 120 and other activities reported by the partners 110, and/or environmental activities offered by the partners 110 to the users 130 such as products and services. In some embodiments, the data transmitted by the registered distributor to the server computer system 160 may include data related to environmental activities such as a product and/or a service distributed to the partners 110 by the distributors 120, and environmental activities such as a product and/or a service used by the distributors 120 to distribute environmental activities to the partners 110. The server computer system 160 may provide the registered partner 110 and/or the registered distributor 120 with an option such as through a website hosted by the server computer system 160 to choose from multiple categories of one or more environmental activities and to list and fill in online information on the environmental activities they offer, report, distribute and/or use.

At step 208, the server computer system 160 receives the data from the registered distributor and/or the registered partner and assigns each environmental activity with an identification number and stores the data in the database of the server computer system 160. The server computer system 160 stores and lists the data in the registered distributors' and/or registered partners' records based on the category of each environmental activity.

Governmental entities, consumer reporting agencies, environmental product declaration program operators, and other entities may act as partners 110. The partners 110 can transmit data to the server computer system 160, the data relating to the environmental activities offered and/or reported by the partners 110. Each of the partners 110 is registered with the server computer system 160. The data for each environmental activity transmitted by each of the partners 110 may include, but not limited to, the unique user identifier of the partners 110 and information on the environmental activity transmitted including, but not limited to, geographical location where the environmental activity was transmitted, an environmental product declaration, and/or information on local and/or international environmental law violations including information about the user and/or partners 110 and/or distributors 120 who violated the law. The information may include but not limited to taxpayer identification number, name, and address.

The environmental product declaration may be in a machine-readable format. The partners 110 may provide the server computer system 160 with the registration number of an environmental product declaration, and/or information on environmental product declaration program operator and/or other information. The environmental product declaration, preferably is a type III environmental product declaration based on ISO 14025 and (a) issued by a specific program operator, or (b) issued by a specific program operator in a specific geographical area such as a specific state, country, continent, or region, or (c) based on a harmonized product category rules including not limited to the European pilot for Product and Organization Environmental Footprint Category Rules (PEFCR, OEFCR). The server computer system may request from a partner 110 to get the transmitted environmental product declaration verified by a specific verifier selected by the server computer system 160.

Type III environmental product declarations based on ISO 14025 for the products and/or services includes information including not limited to information about company, product and/or service; the environmental impacts, including but not limited to global warming potential, depletion potential of the stratospheric ozone layer, acidification potential of land and water, eutrophication potential, formation potential of tropospheric ozone photochemical oxidants, abiotic depletion potential for non-fossil resources, abiotic depletion potential for fossil resources, human toxicity, fresh water aquatic Eco toxicity, marine aquatic Eco toxicity, and terrestrial Eco toxicity; resource use including but not limited to total use of renewable primary energy resources, total use of non-renewable primary, use of secondary material, and use of renewable secondary fuels; waste generation including but not limited to hazardous waste disposed, non-hazardous waste disposed, and radioactive waste disposed; and other information including but not limited to components for re-use, materials for recycling, materials for energy recovery and exported energy.

At step 210, the server computer system 160 verifies each environmental activity and environmental law violation offered or reported by the partners 110, each environmental activity distributed to the partners 110 by the distributors 120, and each environmental activity used by the distributors 120 to distribute environmental activities to the partners 110 and mark each verified environmental activity and environmental law violation. The server computer system 160 may communicate with a program operator to verify an environmental product declaration of a product and/or a service transmitted by the partners 110 and distributors 120. The server computer system 160 may communicate with a registered partner 110 or an unregistered entity to verify an environmental law violation of a particular partners 110, distributors 120 and/or users 130.

At step 212, the server computer system 160 calculates using one or more algorithms a score for each verified environmental activity such as a product and/or a service offered by the partners 110 based on the information included in the verified environmental product declaration of a product and/or a service offered by the partner 110 and the information included in the verified environmental product declarations of similar products and services offered by other partners 110; calculates using one or more algorithms a score for each verified environmental activity such as a product and/or a service used by the distributors 120 to distribute environmental activities to the partners 110 based on the information included in the verified environmental product declaration of a product and/or a service used by the distributor to distribute environmental activity such as a product and/or a service to the registered partner and/or an unregistered entity, and the information included in the verified environmental product declarations of similar products and/or services used by other distributors to distribute environmental activities; and calculates using one or more algorithms a score for each verified environmental law violation reported by the partners 110 based on the environmental impact of each environmental law violation. Further, partners' 110 environmental activities with high scores may be given the priority to be promoted to users 130. In some embodiments, the score and number of verified environmental activities offered by the partners 110, environmental law violations of the partners 110, and the responses of the partners 110 to the suggestions of the server computer system 160 is used to calculate an environmental credit score for the partners 110. The score and number of verified environmental activities used by the distributors 120, environmental law violations of the distributors 120, and the responses of the distributors 120 to the suggestions of the server computer system 160 is to calculate an environmental credit score for the distributors 120. The environmental credit score of the partners 110 and distributor 120 may be calculated for a specific geographical area and/or for a specific type of environmental activities and/or a specific category or classification of a product or a service. The server computer system 160 may add more points to the environmental credit score of the users 130 participate in environmental activities with a high score environmental product declaration and/or mark the partners 110 and distributors 120 with high environmental credits cores with marks, signs, symbols and/or any other benefits. The environmental credit score of the partners 110 and distributors 120 may be used in areas including, but not limited to decisions by the government towards companies and towards any other entities.

At step 214, the user 130 who has previously registered with the server computer system 160 registers with the partners 110 and provides the partners 110 with the user's unique user identifier to complete an environmental activity at a point of service system of the partners 110. The user 130 may enter the unique user identifier on a keypad or other input device at the point of service system, or login to a website or mobile application. Alternately, the user 130 can use an identifying card, a barcode, RFID or electronic tag and/or any other device that can be read by the point of service system to identify or verify the user 130 and to determine the unique user identifier of the user 130. The point of service system may also identify or verify the user 130 using various devices and techniques including but not limited to, cameras, touch screens devices and biometrics such as fingerprint readers, vein reader, facial recognition and hand geometry.

The point of service system of the partners 110 may transmit information to the server computer system 160, the information includes but not limited to information on the environmental activities completed by the user 130, the unique user identifier of the distributor 120 and/or the user 130 and the partner 110, the identification number of each environmental activity, the number of environmental activities, and the geographical location.

At step 216, the server computer system 160 receives the data from the point of service system of the partners 110 and processes the information. From the data for each environmental activity completed by the user 130, the server computer system 160 identifies environmental activity records associated with the unique user identifiers of the distributors 120, user 130, and partners 110 and credits the respective environmental activity records of the distributors 120, user 130, and partners 110 based on the information on the environmental activities completed by the user 130. The distributors 120 can monitor and track the environmental activities such as products and/or services distributed to partners 110 and stored in the environmental activity record of the distributors 120.

At step 218, the server computer system 160 calculates, based on the environmental activity data credited under the record of the user 130 an environmental credit score for the user using one or more algorithms. In some embodiments, the environmental credit score of the user 130 may be calculated for a specific geographical area and/or for a specific product and/or service category, and so forth. In some embodiments, the calculation of an environmental credit score for the user 130 may be done by considering factors including but not limited to (a) the number, category and environmental impact of environmental activities of the user 130 aimed at protecting the environment, (b) the length of the history of environmental activities of the user 130, (c) the score of the environmental product declaration of each environmental activity completed by the user 130, (d) the responses of the user 130 to the activities suggested by the server computer system 160 based on the environmental activities of the user 130 before being a registered user, and (e) the type and number of environmental law violations of the user 130. The calculation of an environmental credit score for the user 130 may be done after every environmental activity credited in the environmental activity record of the user 130 and/or at regular intervals and/or based on a request from the user 130 and/or partner 110.

At step 220, the server computer system 160 analyzes the environmental credit score of users 130, partners 110, and distributors 120 to determine the one or more users, partners, and distributors with a high environmental credit score. The analysis can be done in various areas including but not limited to the category of environmental activities, geographical area, and any other areas. The server computer system 160 may exchange with a user 130 the information related to the environmental credit score of the user 130, benefits available, new rules for environmental credit score calculation, and so forth.

At step 222, the server computer system 160 publishes the environmental credit score data of the users 130, the partners 110, and distributors 120 under the environmental activity records of the users 130, partners 110, and distributors 120 respectively, and, may notify the users 130, partners 110 and distributors 120 and marks or assigns the users 130, partners 110 and distributors 120 with high environmental credit scores with marks, signs, or symbols. The server computer system 160 may receive responses from the users 130, partners 110 and distributors 120 to system messages and proposals.

The environmental credit score of the users 130 can be used by private and/or public and/or voluntary sectors and/or by other entities in areas including but not limited to employment decisions, university admission decisions, and landlord-tenant decisions, decisions of the government towards individuals, companies and any other entities. The environmental credit score of the users 130 can also be used in other areas that may impact consumer's lives including but not limited to determining whether a service, an award, a credit, a scholarship should be offered or granted to the users 130.

At any time, the server computer system 160 can provide information to the partners 110, distributors 120, and users 130 on their environmental activities. The information is preferably displayed on a website hosted by the server computer system 160. The information can be displayed in the form of text and/or graphs. The information may include but not limited to historical data on environmental activities, the environmental credit score, and environmental credit report. The historical data on environmental activities may include but limited to the number, type, time, date and location of environmental activities, and environmental impact information for each environmental activity. An environmental credit report is a statement that has information about the environmental credit activities and current environmental credit situation of the partner 110, distributor 120, or the user 130. An environmental credit report may include but not limited to (a) name, address, birth date, social security number, national identification number, passport number, and phone number, business name, business registration number contact information, environmental activities offered, used and/or reported, employer identification number, and (b) information on current and historical environmental credit activities stored in user's and partner's records. The server computer system may provide the distributors 120 with information on the environmental activities distributed to the partners 110 and completed by the users 130. The server computer system 160 may allow users, partners, and distributors to access the server computer system and display information on a registered user's, partner's, and distributor's environmental activities on a client device operated by the users 130, partners 110, and distributors 120.

The server computer system 160 may allow the users 130 to search for an environmental activity such as a product and/or a service offered by a partner of the partners 110 in specific or any geographical location, the option of allowing the users 130 to search for an environmental activity such as a product and/or a service in a specific or any geographical location may be provided to the users through a website hosted by the server computer system 160 and/or through a mobile application. The server computer system 160 displays the results to the user 130 who search for an environmental activity such as a product and/or a service based on many factors including but not limited to the score of the environmental product declaration of each environmental activity, and the location of the environmental activities. In some embodiments, one or more environmental activities with a high score environmental product declaration may be promoted or suggested to the users 130. For example, the environmental activities with a high score environmental product declaration may be displayed first. The server computer system 160 may determine the geographical location of the user and suggest environmental activities to the user 130 based on its location from the user 130 and its environmental product declaration score.

Any entity offers environmental activities aimed at protecting the environment such as a product or a service to individuals may register with the server computer system as a partner 110, where an individual may register with the server computer system as a user 130. By way of non-limiting example, transportation companies may register with the server computer system 160 as partners 110 and offer environmentally friendly products or services to the user 130. The services offered by transportation companies as partners may include, but are not limited to, the use of electric vehicles that use 100% renewable electricity as an energy source, where an environmental product declaration for each service or product offered by partners is required to be verified and accepted by the server computer system 160. The point of service system of the transportation companies can be in the form of a website or a mobile application, where the users 130 can order online the use of an electric vehicle and provide transportation companies with the unique user identifier of the user 130. Transportation companies as the partners 110 can identify and verify the user 130 in real time through a website or mobile application and transmit information on user's environmental protection activities such as driving activities to the server computer system 160. The information may include, but not limited to, information on the vehicle, miles driven and energy use. Transportation companies as the partners 110 may identify and verify the user 130 when the user 130 uses or pick up the vehicle. The transportation companies including but not limited to car rental companies and ride-hailing companies such as Uber and Lyft, and other ride hailing and transportation network company platforms. Transportation companies may offer to the users 130 services or products including but not limited to recycling trips using electric vehicles that use 100% renewable electricity.

Figure 3:
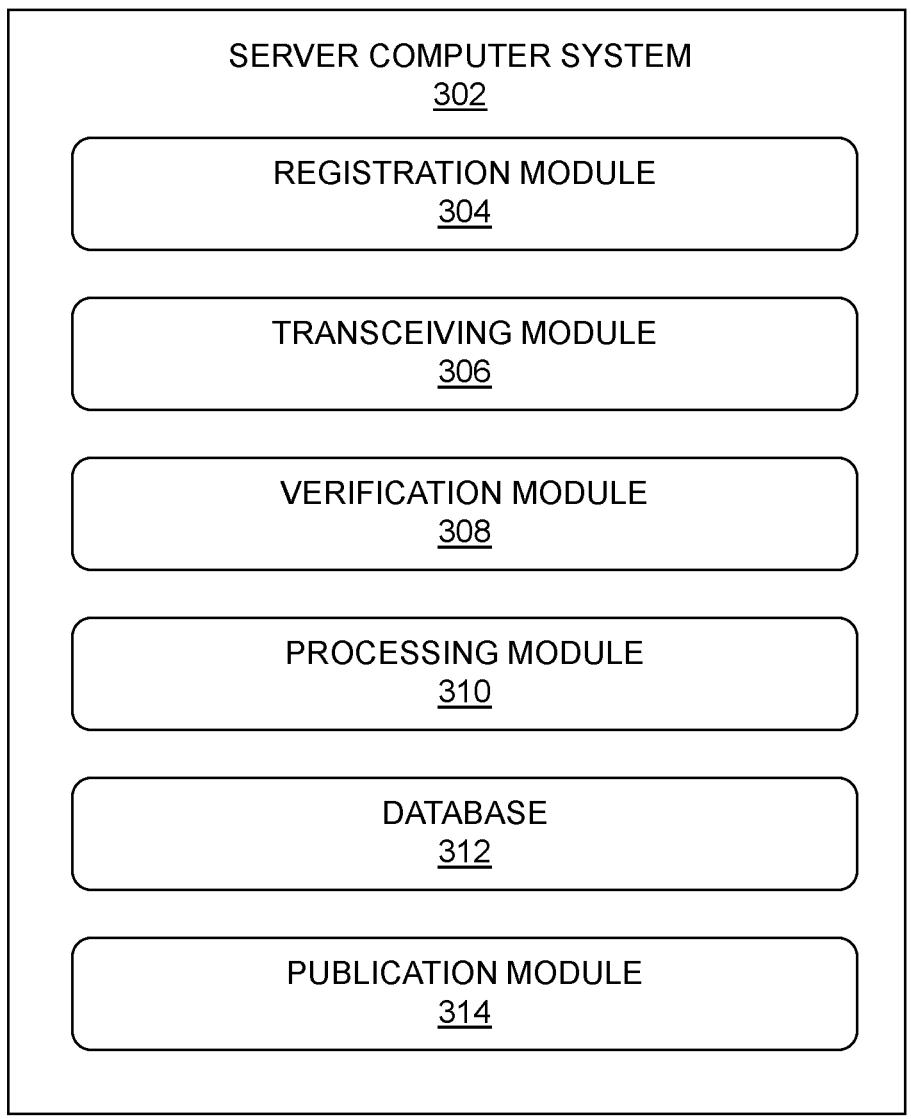
FIG. 3 is a block diagram illustrating system elements of an exemplary server computer system, in accordance with an embodiment.

FIG. 3 is a block diagram 300 illustrating system elements of an exemplary server computer system 302, in accordance with an embodiment of the present disclosure. As shown, the server computer system 302 primarily includes a registration module 304, a transceiving module 306, a verification module 308, a processing module 310, a database 312, and a publication module 314. The registration module 304 is configured to register a plurality of users, partners, and distributors with the server computer system 302 by assigning a unique user identifier to each of the users, partners, and the distributors. The registration module 304 further creates an environmental activity record for each of the registered users, partners, and distributors. The registration module 304 also associates each of the registered users', partners', and distributors' environmental activity records with the users', partners', and distributors' unique user identifiers and stores in the database 312 along with the associated unique user identifiers.

The transceiving module 306 is configured to receive information from the registered users comprising personal information and information about one or more environmental activities completed by the registered users before becoming a registered user, and to assign each of the environmental activities an identification number, the environmental activities information including but not limited to information on home energy, transportation, waste, food, and shopping.

The transceiving module 306 is also configured to receive data relating to environmental activities completed by a registered user from a point of service system of a registered partner; the registered user enters a unique user identifier at the point of service system so as to access the registered user's environmental activity record, the registered partner identifies and verifies the registered user to confirm the completion of one or more environmental activities by the user.

In some embodiments, the transceiving module 306 is further configured to receive at least one environmental activity record from at least one of the plurality of partners, and distributors in real-time. The environmental activity record may include data relating to a plurality of environmental activities and environmental law violations offered or reported by the plurality of partners, environmental activities distributed to the partners by the plurality of distributors, and environmental activities used by the plurality of distributors to distribute environmental activities to the plurality of partners. The data for each environmental activity transmitted by each of the partners may include, but not limited to, the unique user identifier of the partners and information on the environmental activity transmitted including, but not limited to, the geographic location where the environmental activity was transmitted, an environmental product declaration, and/or information on local and/or international environmental law violations including information about the user and/or partners and/or distributors who violated the law. The information may include but not limited to taxpayer identification number, name, and address.

The verification module 308 is configured to verify at least one environmental activity and the received information with at least one environmental product declaration program operator, a registered partner and an unregistered entity. The verification module 308 verifies each environmental activity and environmental law violation offered or reported by the partners, each environmental activity distributed to the partners by the distributors, and each environmental activity used by the distributors to distribute environmental activities to the partners and mark each verified environmental activity and environmental law violation. The verification module 308 may communicate with a program operator to verify an environmental product declaration of a product and/or a service transmitted by the partners. In some embodiments, the verification module 308 may communicate with a registered partner or an unregistered entity to verify an environmental law violation of one of the partners, distributors and/or users. Governmental entities, consumer reporting agencies, environmental product declaration program operators, and other entities may act as partners. The verification module 308 is also configured to verify at least one environmental activity record with at least one environmental product declaration program operator, a registered partner or an unregistered entity.

The processing module 310 is configured to calculate, using one or more algorithms a score for each verified environmental activity such as a product and/or a service offered by the partners based on the information included in the verified environmental product declaration of a product and/or a service offered by the partner and the information included in the verified environmental product declarations of similar products and services offered by other partners; calculate, using one or more algorithms a score for each verified environmental activity such as a product and/or a service used by the distributors to distribute environmental activities to the partners based on the information included in the verified environmental product declaration of a product and/or a service used by the distributor to distribute environmental activity such as a product and/or a service to a registered partner and/or an unregistered entity, and the information included in the verified environmental product declarations of similar products and/or services used by other distributors to distribute environmental activities; and to calculate, using one or more algorithms a score for each verified environmental law violation reported by the partners based on the environmental impact of each environmental law violation.

In an embodiment, the processing module 310 is also configured to calculate, using one or more algorithms an estimated environmental impact of the environmental activities completed by the registered user before becoming a registered user.

In an embodiment, the processing module 310 is also configured to calculate, using one or more algorithms an environmental credit score of the partners based on factors including but not limited to the score and number of verified environmental activities offered by the partners, environmental law violations of the partners, and the responses of the partner to the suggestions of the server computer system.

In an embodiment, the processing module 310 is also configured to calculate, using one or more algorithms an environmental credit score of the distributors based on factors including but not limited to the score and number of verified environmental activities used by the distributors, environmental law violations of the distributors, and the responses of the distributor to the suggestions of the server computer system.

Further, the processing module 310 is also configured to identify the environmental activity records of at least one of the plurality of users, partners, and distributors associated with the unique user identifier for each of the environmental activities completed by the user, and credit respective environmental activity records based on the environmental activities completed by the user.

In some embodiments, the processing module 310 is also configured to calculate, using one or more algorithms an environmental credit score for the registered user based on factors including but not limited to (a) the number, category and environmental impact of environmental activities of the user aimed at protecting the environment, (b) the length of the history of environmental activities of the user, (c) the score of the environmental product declaration of each environmental activity completed by the user, (d) the responses of the user to the activities suggested by the server computer system based on the environmental activities of the user before being a registered user, and (e) the type and number of environmental law violations of the user.

In some embodiments, the processing module 310 may use one or more algorithms to calculate an environmental credit score for the partners. Each of the environmental activities has an associated environmental product declaration, the environmental product declaration may be in a machine-readable format, and is a type III environmental product declaration based on ISO 14025 and (a) issued by a specific program operator, or (b) issued by a specific program operator in a specific geographical area where the server computer system operates such as a specific state, country, continent, or region, or (c) based on a harmonized product category rules including but not limited to the European pilot for Product and Organization Environmental Footprint Category Rules (PEFCR, OEFCR).

In an embodiment, the processing module 310 is further configured to allow users to search for an environmental activity such as a product and/or a service offered by a partner in a specific or any geographical location. The environmental activities are displayed to the users based on factors including but not limited to the score of the environmental product declaration of each of the environmental activities and the geographical location of the environmental activities. In some embodiments, the environmental activities with high scores are given the priority to be promoted to the users. Further, the environmental activities may comprise environmental activities mentioned in the United Nations expert group meeting on classifications (New York, 20 May 2011) and consists of three parts: (a) Environmental protection activities and expenditures, (b) Resource management activities and expenditures, and (c) Resource use activities and expenditures. The environmental activities may also comprise all activities aimed at protecting the environment including but not limited to recycling; purchasing environmentally friendly products and services; and using renewable electricity, electric vehicles, and other environmentally friendly products and services.

In an embodiment, the processing module 310 is configured to display the environmental activities based on the score of the environmental product declaration of each of the environmental activities, wherein the environmental activities with a high score environmental product declaration are displayed first.

In some embodiments, the processing module 310 is configured to determine a geographical location of the users and suggest environmental activities to the users based on its location from the users and its environmental product declaration score. The processing module 310 may be configured to provide an option of allowing users to search for an environmental activity in a geographical location such as a product and/or a service offered by a partner to the users through a web site hosted by the server computer system and/or through a mobile application.

The processing module 310 is also configured to analyze the environmental credit score of users, partners, and distributors to determine the one or more users, partners, and distributors with a high environmental credit score. Further, the processing module 310 is configured to publish the environmental credit scores of the users, partners, and distributors and notify the users, partners, and distributors.

In some embodiments, the processing module 310 is also configured to suggest at least one environmental activity to the registered user for reducing the environmental impact of environmental activities of the registered user based on the calculated environmental impact of the environmental activities before being the registered user.

In some embodiments, the processing module 310 is also configured to calculate, using one or more algorithms an environmental credit score for each of the registered users based on the environmental impact of the environmental activities of the registered user before being the registered user and the participation of the registered user in the suggested at least one environmental activity after being the registered user; and analyze the environmental credit score of the plurality of users to determine one or more users with a high environmental credit score.

In an embodiment, the processing module 310 is also configured to calculate, using one or more algorithms the environmental credit score of the registered partners and registered distributors for at least one of a specific geographical area, a specific type of environmental activities, a specific category or classification of a product or service.

In some embodiments, the processing module 310 is also configured to add more points to the environmental credit score of one or more users participating in environmental activities with a high score environmental product declaration.

In some embodiments, the processing module 310 is also configured to mark users, partners and distributors with high environmental credits cores with marks, signs, symbols and/or any other benefits.

Further, the processing module 310 calculates an environmental credit score for the partners and distributors after every verified environmental activity credited in the registered partner's and distributor's environmental activity record and/or at a regular interval and/or based on a request from the registered partner.

The database 312 is configured to store personal information and environmental activities information of the registered users, registered partners, and registered distributors. In some embodiments, the database 312 is further configured to store at least one environmental activity record of partners, users, and distributors, and list the data in the distributors', partners', and users' environmental activity records based on the category of each environmental activity. Further, the database 312 may maintain a plurality of environmental activity records associated with a unique user identifier of the plurality of users, partners, and distributors. Each of the plurality of the environmental activity records including but not limited to information about the environmental activities and environmental law violations. A distributor of the registered distributes can monitors and tracks the environmental activities comprising products and/or services distributed to the partners and stored in the distributors' environmental activity record.

The publication module 314 is configured to publish the environmental credit score data of the plurality of users, partners, and distributors under respective environmental activity records of the plurality of users, partners, and distributors.

The environmental credit score of the users may be used by entities including, but not limited to, private sector organizations, public sector organizations, voluntary sectors and/or by other entities in areas including but not limited to, employment decisions, university admission decisions, and landlord-tenant decisions, decisions of the government towards individuals, companies and any other entities. Further, the environmental credit score may be used in other areas that may impact consumer's lives such as determining whether a service, an award, a credit, a scholarship should be offered or granted to the user.

In accordance with one or more embodiments, a method is provided for environmental credit scoring based on environmental activities of users, partners, and distributors. The method includes creating a distributor environmental activity record, a partner environmental activity record, and a user environmental activity record accessible by a server computer system for each of a plurality of distributors, partners, and users and associating each distributor's, partner's, and user's record with a unique user identifier. The method also includes collecting information on the environmental activities completed by a user before becoming a registered user. The method also includes verifying the information provided by the user with a registered partner and/or an unregistered entity. The method also includes calculating using one or more algorithms an estimated environmental impact of the user's environmental activities based on the information collected from the user, and using the environmental impact of the user's environmental activities before being a registered user to suggest environmental activities to the user that can help in reducing the environmental impact of the user's environmental activities, the environmental impact of the user's environmental activities before being a registered user and the participation of the user in environmental activities suggested by the server computer system after being a registered user can be used in the calculation of an environmental credit score for the user.

The method also includes receiving data in real time at the server computer system from a plurality of distributors and partners over a communications network and storing the data in the database of the server computer system; the data received from partners relating to environmental activities such as but not limited to users', partners' and distributors' environmental law violations and other activities and/or environmental activities offered by partners to a plurality of users; the data received from distributors relating to environmental activities such as a product and/or a service distributed to partners by the distributors, and environmental activities such as a product and/or a service used by the distributors to distribute environmental activities to partners; and the data for each environmental activity transmitted by a partner including but not limited to the unique user identifier of the partner and information on the environmental activity transmitted, where the information on the environmental activity transmitted may identify the distributor associated with the environmental activity. The information on the environmental activity transmitted includes but is not limited to the geographical location where the environmental activity was transmitted, an environmental product declaration, and/or information on local and/or international environmental law violations; verifying the data received from a plurality of distributors and partners and assessing the environmental impact of each environmental activity, such as a product and/or a service and/or an environmental law violation offered or reported by partners; calculating, using one or more algorithms a score for each environmental activity offered by partners to users based on the environmental impact information included in the environmental product declaration of a product and/or service offered by the partner and the information included in the environmental product declarations of similar products and services offered by other partners; calculating using one or more algorithms a score for each environmental activity used by the distributors to distribute environmental activities to partners based on the environmental impact information included in the environmental product declaration of a product and/or service used by the distributor to distribute environmental activity, such as a product and/or service to the registered partner and/or an unregistered entity, and the information included in the verified environmental product declarations of similar products and/or services used by other distributors to distribute environmental activities; calculating a score using one or more algorithms a score for each environmental law violation based on the environmental impact of each environmental law violation. The score and number of verified environmental activities offered by partners, environmental law violations of partners, and the responses of partners to the suggestions of the server computer system can be used to calculate an environmental credit score for the partner. The score and number of verified environmental activities used by the distributors, the environmental law violations of the distributors, and the responses of the distributor to the suggestions of the server computer system can be used to calculate an environmental credit score for the distributor, allowing partners to identify users at partners' point of service systems, where a user can provide a partner with a unique user identifier to confirm the participation of the user in the environmental activities offered by the partner; receiving data in real time at the server computer system from a plurality of partners' point of service systems over a communications network and storing the data in the database of the server computer system, the data relating to environmental activities completed by users and confirmed by partners at partners' point of service systems. The data for each environmental activity completed by a user, including but not limited to, the unique user identifiers of user and partner, information on the environmental activities completed, and information on the distributor if the environmental activity was distributed to the partner by a distributor; from the data for each environmental activity completed by a user identifying the distributor and/or user and partner environmental activity records associated with the unique user identifiers and crediting the distributor and/or user and partner environmental activity records based on the information on the environmental activities completed by the user; and calculating an environmental credit score for users using one or more algorithms. The calculation of an environmental credit score for registered users is based on factors including but not limited to (a) the number, category, and environmental impact of the environmental activities of the user that aim to protect the environment; (b) the length of the history of the environmental activities of the user; (c) the score of the environmental product declaration of each environmental activity completed by the user; (d) the user's responses to the activities suggested by the server computer system based on the environmental activities of the user before being a registered user; and (e) the type and number of environmental law violations of the user.

The method also includes analyzing the environmental credit scores of users in various areas, including but not limited to the type of environmental activities and geographical areas or any other areas. The method also includes publishing the environmental credit score data of users, partners, and distributors under the environmental activity records of users, partners and distributors; granting a user benefits such as points when the user refers another user to register with the server computer system; and marking users, partners, and distributors with high environmental credits scores with marks, signs, or symbols. The method also includes using the environmental credit score of users by private and/or public and/or voluntary sectors and/or by other entities in areas including but not limited to employment decisions, university admission decisions, and landlord-tenant decisions and decisions of the government toward individuals, companies, and any other entities; and using the environmental credit score in other areas that may affect consumer' lives, such as determining whether a service, an award, a credit, or a scholarship should be offered or granted to the user. The method also includes allowing users to search for an environmental activity such as a product and/or a service offered by a partner in a specific geographical location. The method also includes providing distributors information on the environmental activities distributed to partners and completed by users.

In accordance with one or more embodiments, a system is provided for environmental credit scoring based on the environmental activities of users, partners, and distributors. The system includes a plurality of point of service systems for receiving environmental activity data of users. The system also includes a server computer system in communication with each of the plurality of point of service systems over a communications network. The server computer system is configured to create distributor, partner, and user environmental activity records that are accessible to each of a plurality of distributors, partners, and users, each distributor's, partner's, and user's record being associated with a unique user identifier; collect information on the environmental activities completed by the user before becoming a registered user. The server computer system is also configured to verify the information provided by the user with a registered partner and/or an unregistered entity; calculate using one or more algorithms an the estimated environmental impact of the user's environmental activities based on the information collected from the user; use the environmental impact of the user's environmental activities before being a registered user to suggest environmental activities to the user, where the environmental impact of the user's environmental activities before being a registered user and the participation of the user in the environmental activities suggested by the server computer system after being a registered user can be used in calculating an environmental credit score for the user.

The server computer system is also configured to receive data in real time from a plurality of distributors and partners and store the data in the database of the server computer system, the data received from partners relating to environmental activities including but not limited to users', partners', and distributors' environmental law violations and other activities and/or environmental activities offered by partners to a plurality of users. The data received from distributors relating to environmental activities such as a product and/or a service distributed to partners by distributors, and environmental activities such as a product and/or a service used by the distributors to distribute environmental activities to partners. The environmental activity data offered by partners can be promoted to users. The server computer system is also configured to verify the data received from the plurality of distributors and/or partners and assess the environmental impact of each environmental activity, such as a product and/or a service and/or an environmental law violation offered or reported by partners. The server computer system is also configured to calculate, using one or more algorithms a score for each environmental activity offered by partners to users based on the environmental impact information included in the environmental product declaration of a product and/or a service offered by the partner and the information included in the environmental product declarations of similar products and services offered by other partners; calculate using one or more algorithms a score for each environmental activities used by the distributors to distribute environmental activities to partners based on the environmental impact information included in the environmental product declaration of a product and/or a service used by the distributor to distribute the environmental activities, such as a product and/or a service to the registered partner and/or an unregistered entity, and the information included in the verified environmental product declarations of similar products and/or services used by other distributors to distribute environmental activities; and calculate, using one or more algorithms a score for each environmental law violation based on the environmental impact of each environmental law violation. The score and number of verified environmental activities offered by partners, environmental law violations of partners, and the responses of partners to the suggestions of the server computer system can be used to calculate an environmental credit score for partners. The score and number of verified environmental activities used by the distributors, environmental law violations of the distributors, and the responses of the distributors to the suggestions of the server computer system can be used to calculate an environmental credit score for the distributors. The server computer system is also configured to allow partners to identify users at partners' point of service systems, Users can provide partners with unique user identifiers to confirm the participation of users in the environmental activities offered by partners. The server computer system is also configured to receive data in real time from a plurality of point of service systems and store the data in the database of the server computer system, the data relating to the environmental activities completed by users and confirmed by partners at partners' systems, the data for each environmental activity completed by a user, including but not limited to the unique user identifiers of user, partner, and distributor; information on the environmental activities completed; and information on the distributor if the environmental activity distributed to the partner by a distributor.

The server computer system is also configured to identify, from the data for each environmental activity completed by a user, the distributor and/or user and partner environmental activity records associated with the unique user identifiers and credit the distributor and/or user and partner environmental activity records based on the information on the environmental activities completed by the user. The server computer system is also configured to calculate, using one or more algorithms, an environmental credit score for users. The calculation of an environmental credit score for the registered users is based on factors including but not limited to (a) the number, category, and environmental impact of environmental activities of the user aimed to protect the environment; (b) the length of the history of the environmental activities of the user; (c) the score of the environmental product declaration of each environmental activity completed by the user, and (d) the user's responses to the activities suggested by the server computer system that were suggested based on the environmental activities of the user before being a registered user, and (e) the type and number of environmental law violations of the user. The server computer system is also configured to analyze the environmental credit scores of users, partners, and distributors in various areas including but not limited to the type of environmental activities, geographical areas, and any other areas.

The server computer system is also configured to publish the environmental credit score data of users, partners, and distributors under the environmental activity records of users, partners, and distributors; and grant a user with benefits such as points when the user refers another user to register with the server computer system; and mark users, partners, and distributors with high environmental credits scores with marks, signs, or symbols. The server computer system is also configured to allow users to search for an environmental activity such as a product and/or a service offered by a partner in a specific geographical location. The server computer system is also configured to provide distributors with information on the environmental activities that have been distributed to partners and completed by users. The server computer system is also configured to allow distributors and/or partners, and/or users of the server computer system to monitor and gather real-time data on their environmental activities and allow partners to gather information on the environmental activity data of users.

The disclosed system comprising the server computer system is configured to analyze the environmental credit score of users to determine one or more users, partners, and distributors with a high environmental credit score. The analysis may be done in various areas including but not limited to the category of environmental activities and geographical areas or any other areas. The server computer system can exchange with users, partners, and distributors information related to the environmental credit score of the users, partners, and distributors; the benefits available; new rules for environmental credit score calculation; and so forth. The server computer system can receive users', partners', and distributors' responses to system messages and proposals. The server computer system may mark one or more users, partners, and distributors with high environmental credit scores with marks, signs, or symbols. The server computer system may grant a user with benefits such as points when the user refers another user to register with the server computer system.

Further, the disclosed system comprising the server computer system of the present disclosure is configured to publish the environmental credit score data of the users, partners, and distributors under environmental activity records of the users, partner and distributors.

The methods and systems of the present disclosure are for calculating environmental credit scores of users, partners, and distributors. The environmental credit score of users may be used by private and/or public and/or voluntary sectors and/or by other entities in areas including but not limited to employment decisions, university admission decisions, and landlord-tenant decisions, decisions of the government towards individuals, companies and any other entities may use the environmental credit score of the users. Further, the environmental credit score may be used in other areas that may impact consumers' lives such as determining whether a service, awards, credit, scholarships should be offered or granted to the user. The environmental credit score of the partners and distributors can be used in areas such as but not limited to decisions of the government towards companies and towards any other entities.

The methods and systems of the present disclosure enables the users to search for an environmental activity such as a product and/or a service offered by a partner in a specific geographical location. The disclosed server computer system displays environmental activities based on the score of the environmental product declaration of each environmental activity, environmental activities with a high score environmental product declaration will be displayed first. The server computer system may determine the geographical location of the user and suggest environmental activities to the user based on its location from the user and its environmental product declaration score. The option of allowing users to search for an environmental activity in a specific geographical location such as, a product and/or a service offered by a partner may be provided to users by the server computer system through a web site hosted by the server computer system and/or through a mobile application.

The methods and systems of the present disclosure allows the users to access the disclosed server computer system and display information on a registered user's environmental activities on a client device operated by the user, wherein the information displayed to the user including but not limited to the environmental activities and an environmental credit score of the user, the user can access the server computer system through a website hosted by the server computer system or a mobile application.

The methods and systems of the present disclosure provide distributors with information on the environmental activities that have been distributed to partners and completed by users.

The methods and system of the present disclosure enables the distributors and/or partners, and/or users to monitor and gather real-time data on their environmental activities and allow partners to gather information on the environmental activity data of users.

The processes described above executing in the server computer system 160 including the point of service systems may be implemented in firmware, hardware, software, or any combination thereof. The processes are preferably implemented in a computer program or multiple computer programs executing on a programmable computer including a storage medium readable by the processor (including, e.g., volatile and non-volatile memory and/or storage elements), input and output devices, and a processor. Each computer program can be a set of instructions (program code) in a code module resident in the random-access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

The server computer system 160 may comprise a physical machine or multiple physical machines, or virtual machines running on a physical machine or multiple physical machines. In addition, the server computer system may comprise a cluster of computers or multiple distributed computers that are connected by the network or the Internet.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While the invention has been described in connection with what is presently considered to be the most practical and various embodiments, it is to be understood that the invention is not to be limited to the disclosed embodiments, but on the contrary, is intended to cover various modifications and equivalent arrangements.

What is claimed is:

1. A method for environmental credit scoring of a plurality of users, partners, and distributors, comprising:
registering the plurality of users, partners, and distributors by assigning a unique user identifier;
receiving information from the registered users comprising personal information and information about one or more environmental activities completed by the registered users before becoming registered users, wherein the environmental activities information comprising information on home energy, transportation, waste, food, and shopping;
receiving at least one environmental activity record from at least one of a plurality of partners, and a plurality of distributors in real-time, wherein the environmental activity record comprising data relating to a plurality of environmental activities and environmental law violations offered or reported by the plurality of partners, and environmental activities distributed to the partners by the plurality of distributors;
assigning each of the environmental activities an identification number;
verifying at least one environmental activity record with at least one environmental product declaration program operator, a registered partner or an unregistered entity;
calculating a score of each verified environmental activity offered by the partners based on environmental impact information included in a verified environmental product declaration of a product and/or a service offered by the partner and the information included in verified environmental product declarations of similar products and services offered by other partners, and calculating a score of each environmental law violation reported by the partners based on the environmental impact information of each environmental law violation, the each verified activity including offering one or more of a product and a service by partners to users;
calculating an environmental credit score of the partners and the distributors based on the calculated scores;
receiving data relating to environmental activities completed by a registered user from a point of service system of a registered partner, wherein the registered user enters a unique user identifier at the point of service system so as to access the registered user's environmental activity record, the registered partner identifies and verifies the registered user to confirm the completion of one or more environmental activities by the user;
matching the environmental activity records of at least one of the plurality of users, partners, and distributors with the unique user identifier to identify the environmental activity records of the at least one of the plurality of users, partners, and distributors associated with the unique user identifier for each of the environmental activities completed by the user, and crediting respective environmental activity records based on the environmental activities completed by the user;

calculating an environmental credit score for the registered user based on the environmental activities' data credited under the environmental activity record of the user;

analyzing the environmental credit score of the users to determine the one or more users with a high environmental credit score; and publishing the environmental credit scores of the users and notifying the users.

2. The method of claim 1 further comprising storing personal information and environmental activities information of the registered users, registered partners, and registered distributors, wherein a distributor of the registered distributors monitors and tracks the environmental activities comprising products and/or services distributed to the partners and stored in the distributors' environmental activity record.

3. The method of claim 2, wherein the environmental credit score of the registered user, partner and distributor is calculated for at least one of a specific geographical area, a specific type of environmental activities, a specific category or classification of a product or service, wherein more points being added to the environmental credit score of one or more users participating in environmental activities with a high score environmental product declaration and/or marking users, partners, and distributors with high environmental credits cores with marks, signs, symbols and/or any other benefits, wherein, the environmental credit score of users is used by private and/or public and/or voluntary sectors and/or other entities in areas including employment decisions, university admission decisions, and landlord-tenant decisions, decisions of the government towards individuals, companies and any other entities, using the environmental credit score in other areas that may impact consumer's lives, the areas including determining whether a service, awards, a credit, and scholarships should be offered or granted to the user.

4. The method of claim 3, wherein the environmental activities comprise environmental protection activities and expenditures, resource management activities and expenditures, and resource use activities and expenditures.

5. The method of claim 4 further comprising:

suggesting at least one environmental activity to the registered user for reducing the environmental impact of environmental activities of the registered user based on the calculated environmental impact of the environmental activities before being the registered user, wherein a geographical location of the users is determined and environmental activities are suggested to the user based on location of the environmental activities from the user and environmental product declaration score of the environmental activities; and calculating an environmental credit score for each of the registered users based on the environmental impact of the environmental activities of the registered user before being the registered user and the participation of the registered user in the suggested at least one environmental activity after being the registered user.

6. The method of claim 5, wherein the environmental activities with high scores are given the priority to be promoted to the users.

7. The method of claim 6, wherein the calculation of an environmental credit score for one of the partners is done after every verified environmental activity credited in the registered partner's environmental activity record and/or at a regular interval and/or based on a request from the registered partner.

8. The method of claim 7, wherein each of the environmental activities has an associated environmental product declaration, the environmental product declaration being (a) issued by a specific program operator, or (b) issued by a specific program operator in a specific geographical area where the server computer system operates including a specific state, country, continent, or region, or (c) based on a harmonized product category rules, wherein the environmental activities offered by a partner can be promoted to the users and can be publicly accessible by the users.

9. The method of claim 8, further comprising displaying the environmental activities based on the score of the environmental product declaration of each of the environmental activities, wherein the environmental activities with a high score environmental product declaration are displayed first.

10. The method of claim 9 further comprising presenting an option to the users to search for an environmental activity comprising product and/or a service offered by a partner in a specific geographical location through at least one of a website hosted by the server computer system and a mobile application.

11. A system for environmental credit scoring of a plurality of users, partners, and distributors, comprising:

a server computer system comprising:

a registration module configured to register the plurality of users, partners, and distributors by assigning a unique user identifier;

a transceiving module configured to:

receive information from the registered users comprising personal information and information about one or more environmental activities completed by the registered users before becoming a registered user, and assigns each of the environmental activities an identification number, wherein the environmental activities information comprising information on home energy, transportation, waste, food, and shopping; and receive data relating to environmental activities completed by a registered user from a point of service system of a registered partner, wherein the registered user enters a unique user identifier at the point of service system so as to access the registered user's environmental activity record, the registered partner identifies and verifies the registered user to confirm the completion of one or more environmental activities by the user;

a verification module configured to verify at least one environmental activity record with at least one environmental product declaration program operator, a registered partner or an unregistered entity; and a processing module configured to:

calculate a score for each environmental activity based on environmental impact information included in an environmental product declaration of a product and/or a service offered by the partner and the information included in environmental product declarations of similar products and services offered by other partners, the each environmental activity including offering one or more of a product and a service by partners to users;

calculate a score for each environmental activities used by the distributors to distribute environmental activities to the partners based on the environmental impact information included in the environmental product declaration of a product and/or a service used by the distributor to distribute environmental activity to the registered partner and/or an unregistered entity, and the information included in the verified environmental product declarations of similar products and/or services used by other distributors to distribute environmental activities;

calculate a score for each environmental law violation based on the environmental impact of each environmental law violation;

calculate an environmental credit score of the partners and distributors based on the calculated scores;

matching the environmental activity records of at least one of the plurality of users, partners, and distributors with the unique user identifier to identify the environmental activity records of the at least one of the plurality of users, partners, and distributors associated with the unique user identifier for each of the environmental activities completed by the user, and crediting respective environmental activity records based on the environmental activities completed by the user;

calculate an environmental credit score for the registered user based on the environmental activities' data credited under the environmental activity record of the user;

analyze the environmental credit score of the users to determine the one or more users with a high environmental credit score; and a publication module configured to publish the environmental credit scores of the users and notify the users.

12. The system of claim 11, wherein the server computer system further comprising a database configured to store personal information and environmental activities information of the registered users, registered partners, and registered distributors, wherein a distributor of the registered distributors monitors and tracks the environmental activities comprising products and/or services distributed to the partners and stored in the distributors' environmental activity record.

13. The system of claim 12, wherein the processing module is further configured to:

calculate the environmental credit score of the registered user for at least one of a specific geographical area, a specific product, service category, wherein the server computer system further comprising a publication module configured to publish the environmental credit score data of the plurality of users, partners, and distributors under respective environmental activity records of the plurality of users, partners and distributors; and calculate the environmental credit score of the registered partners and distributors for at least one of a specific geographical area, a specific type of environmental activities, a specific category or classification of a product or service, wherein more points being added to the environmental credit score of one or more users participating in environmental activities with a high score environmental product declaration and/or marking users, partners, and distributors with high environmental credits cores with marks, signs, symbols and/or any other benefits, further wherein the processing module calculates the environmental credit score for the partners and distributors after every verified environmental activity credited in the registered partner's and distributor's environmental activity records and/or at a regular interval and/or based on a request from the registered partner or the registered distributor.

14. The system of claim 13, wherein the environmental activities comprise environmental protection activities and expenditures, resource management activities and expenditures, and resource use activities and expenditures.

15. The system of claim 14, wherein the processing module is further configured to:

suggest at least one environmental activity to the registered user for reducing the environmental impact of environmental activities of the registered user based on the calculated environmental impact of the environmental activities before being the registered user, wherein a geographical location of the users is determined and environmental activities are suggested to the user based on a location of the environmental activities from the user and environmental product declaration score of the environmental activities;

calculate an environmental credit score for each of the registered users based on the environmental impact of the environmental activities of the registered user before being the registered user and the participation of the registered user in the suggested at least one environmental activity after being the registered user; and analyze the environmental credit score of the plurality of users to determine one or more users with a high environmental credit score.

16. The system of claim 15, wherein the environmental credit score of users is used by private and/or public and/or voluntary sectors and/or other entities in areas including employment decisions, university admission decisions, and landlord-tenant decisions, decisions of the government towards individuals, companies and any other entities, using the environmental credit score in other areas that may impact consumer's lives, the areas including determining whether a service, awards, a credit, and scholarships should be offered or granted to the user, wherein the environmental activities with high scores are given the priority to be promoted to the users.

17. The system of claim 16, wherein processing module is configured to calculate the environmental credit score for one of the partners after every verified environmental activity is credited in the registered partner's environmental activity record and/or at a regular interval and/or based on a request from the registered partner.

18. The system of claim 17, wherein each of the environmental activities has an associated environmental product declaration, the environmental product declaration being (a) issued by a specific program operator, or (b) issued by a specific program operator in a specific geographical area where the server computer system operates such as a specific state, country, continent, or region, or (c) based on a harmonized product category rules, wherein the environmental activities offered by a partner can be promoted to the users and can be publicly accessible by the users.

19. The system of claim 18, wherein the processing module is further configured to display the environmental activities based on the score of the environmental product declaration of each of the environmental activities, wherein the environmental activities with a high score environmental product declaration are displayed first.

20. The system of claim 19, wherein the processing module is further configured to allow the users to search for an environmental activity such as a product and/or a service offered by a partner in a specific geographical location, the environmental activities are displayed to the users based on the score of the environmental product declaration of each of the environmental activities.

\* \* \* \* \*